United States Patent
Gabou et al.

(10) Patent No.: US 6,583,714 B1
(45) Date of Patent: Jun. 24, 2003

(54) METHOD OF PROTECTING A RADIOCOMMUNICATIONS TERMINAL AGAINST UNAUTHORIZED USE

(75) Inventors: Ronan Gabou, Paris (FR); Xavier Marty, Courbevoie (FR); Luc Davenas, Colombes (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/414,310

(22) Filed: Oct. 7, 1999

(Under 37 CFR 1.47)

(30) Foreign Application Priority Data

Oct. 8, 1998 (FR) .............................. 98 12608

(51) Int. Cl.$^7$ ................................. H04Q 9/00
(52) U.S. Cl. ................. 340/5.54; 340/5.51; 340/5.8; 340/5.85; 340/5.9; 455/411
(58) Field of Search ..................... 340/5.54, 5.1, 340/5.2, 5.21, 5.3, 5.31, 5.32, 5.51, 5.8, 5.81, 5.85; 455/565, 567, 410, 411, 415, 403, 575

(56) References Cited

U.S. PATENT DOCUMENTS

| | | | | |
|---|---|---|---|---|
| 4,670,747 A | * | 6/1987 | Borras et al. ......... | 340/825.56 |
| 5,241,583 A | * | 8/1993 | Martensson ........... | 340/825.5 |
| 5,444,764 A | * | 8/1995 | Galecki ................ | 379/357.02 |
| 5,457,737 A | * | 10/1995 | Wen .................... | 455/410 |
| 5,500,655 A | * | 3/1996 | Isawa et al. ........... | 345/168 |
| 5,551,073 A | * | 8/1996 | Sammarco ............. | 340/5.8 |
| 5,646,604 A | | 7/1997 | Maruyama et al. | |
| 5,805,084 A | * | 9/1998 | Mannisto ............... | 340/5.51 |
| 5,987,609 A | * | 11/1999 | Hasebe .................. | 713/200 |
| 6,124,799 A | * | 9/2000 | Parker .................. | 340/5.2 |
| 6,141,436 A | * | 10/2000 | Srey et al. ............. | 340/5.74 |
| 6,192,236 B1 | * | 2/2001 | Irvin ..................... | 340/5.1 |
| 6,266,541 B1 | * | 7/2001 | Noda .................... | 455/410 |
| 6,320,957 B1 | * | 11/2001 | Draganoff .............. | 379/354 |
| 6,351,634 B1 | * | 2/2002 | Shin ..................... | 380/247 |

FOREIGN PATENT DOCUMENTS

| | | |
|---|---|---|
| EP | 0 768 786 A2 | 4/1997 |
| GB | 2 234 883 A | 2/1991 |
| GB | 2 236 205 A | 3/1991 |
| GB | 2 304 001 A | 3/1997 |
| GB | 2 320 397 A | 6/1998 |

* cited by examiner

Primary Examiner—Nina Tong
(74) Attorney, Agent, or Firm—Sughrue Mion, PLLC (57) ABSTRACT

The invention concerns a method of protecting a radiocommunications terminal against unauthorized use, the terminal being adapted to send and receive a plurality of types of user information and a plurality of types of terminal information. According to the invention, when no user information is transmitted, the terminal is automatically switched to a secure mode in which the sending of at least one type of user information is prohibited and the sending of at least one type of terminal information is authorized, secure mode being canceled by entering a predetermined code. The invention applies in particular to GSM mobile terminals.

11 Claims, 7 Drawing Sheets

METHOD OF PROTECTING A RADIOCOMMUNICATIONS TERMINAL AGAINST UNAUTHORIZED USE

The present invention relates to a method of protecting a radiocommunications terminal from unauthorized use and to a terminal including means for implementing the method.

BACKGROUND OF THE INVENTION

Without implying any limitation on the invention, "radiocommunications terminal" means Personal Handy-Phone System (PHS) cordless telephones, Digital European Cordless Telecommunications (DECT) cordless telephones, Global System for Mobile Communications (GSM) cellular mobile telephones, Cordless Telephony System (CTS) cellular mobile telephones, and pagers.

The invention applies to terminals intended to send and receive a plurality of types of user information and a plurality of types of terminal information.

User information means any information transmitted at the initiative of or to the benefit of the user, for example voice call data, SMS (Short Message Service) messages, calls to emergency services.

By analogy, terminal information means any information transmitted at the initiative of or to the benefit of the terminal, for example location signals or the power of the current cell and of adjoining cells.

Standard radiocommunications terminals include means to protect them against unauthorized use when they are not in operation. A "PIN code" known only to the authorized user has to be entered before the terminal can operate. These protection means relate to users' SIM cards, rather than the terminals as such.

However, prior art terminals do not include any means to protect them against unauthorized use when they are operational. Thus users who have entered their PIN code to activate their terminal, but are not using it at the time, cannot prevent another person using the terminal even though the other person may not be authorized to use it and does not know the PIN code.

OBJECTS AND SUMMARY OF THE INVENTION

The invention therefore aims to alleviate the above-mentioned drawbacks.

In a first aspect, the invention therefore provides a method of protecting a radiocommunications terminal against unauthorized use, the terminal being adapted to send and receive a plurality of types of user information and a plurality of types of terminal information.

According to the invention, when no user information is being transmitted, the terminal is automatically switched to a secure mode in which the sending of at least one type of user information is prohibited and the sending of at least one type of terminal information is authorized, secure mode being canceled by entering a predetermined code. Also, all types of user information may be prohibited in the secure mode.

The type of user information whose transmission is prohibited corresponds primarily to call data. The types of terminal information whose reception is authorized correspond primarily to incoming calls or signaling data. Thus in secure mode the terminal can receive calls and its location within the network can be determined, but it cannot be used to make a call by a user who does not know the predetermined code.

In an embodiment of the invention, the screen of the terminal is deactivated when it is in secure mode. This feature reduces the power consumption of the terminal. The larger the screen, the greater the reduction in power consumption. This embodiment is therefore of particular benefit in the case of terminals with a large graphics screen.

In another embodiment of the invention, and allowing for standardization constraints, sending user information of the emergency services call type is authorized in secure mode.

In a second aspect, the invention proposes a radiocommunications terminal adapted to send and receive a plurality of types of user information and a plurality of types of terminal information.

According to the invention the terminal includes protection means for protecting it against unauthorized use by implementing the above-defined method, the protection means comprising:

switch means for switching the terminal automatically to a secure mode in which the sending of at least one type of user information is prohibited and the sending of at least one type of terminal information is authorized, and cancellation means for canceling secure mode.

BRIEF DESCRIPTION OF THE DRAWINGS

Other features of the invention are explained by way of non-limiting example in the following description of embodiments of the invention which is given by way of example only and with reference to the accompanying drawings.

MORE DETAILED DESCRIPTION

The following description of the method of the invention applies to a GSM radiocommunications terminal. The method can of course be applied to any other type of radiocommunications terminal including similar functional means able to implement the various steps of the method.

Also, only the components of the terminal used to implement the method of the invention are described hereinafter. The other components of the terminal necessary for it to operate are well known to the skilled person and are not described in detail.

Figure 1:
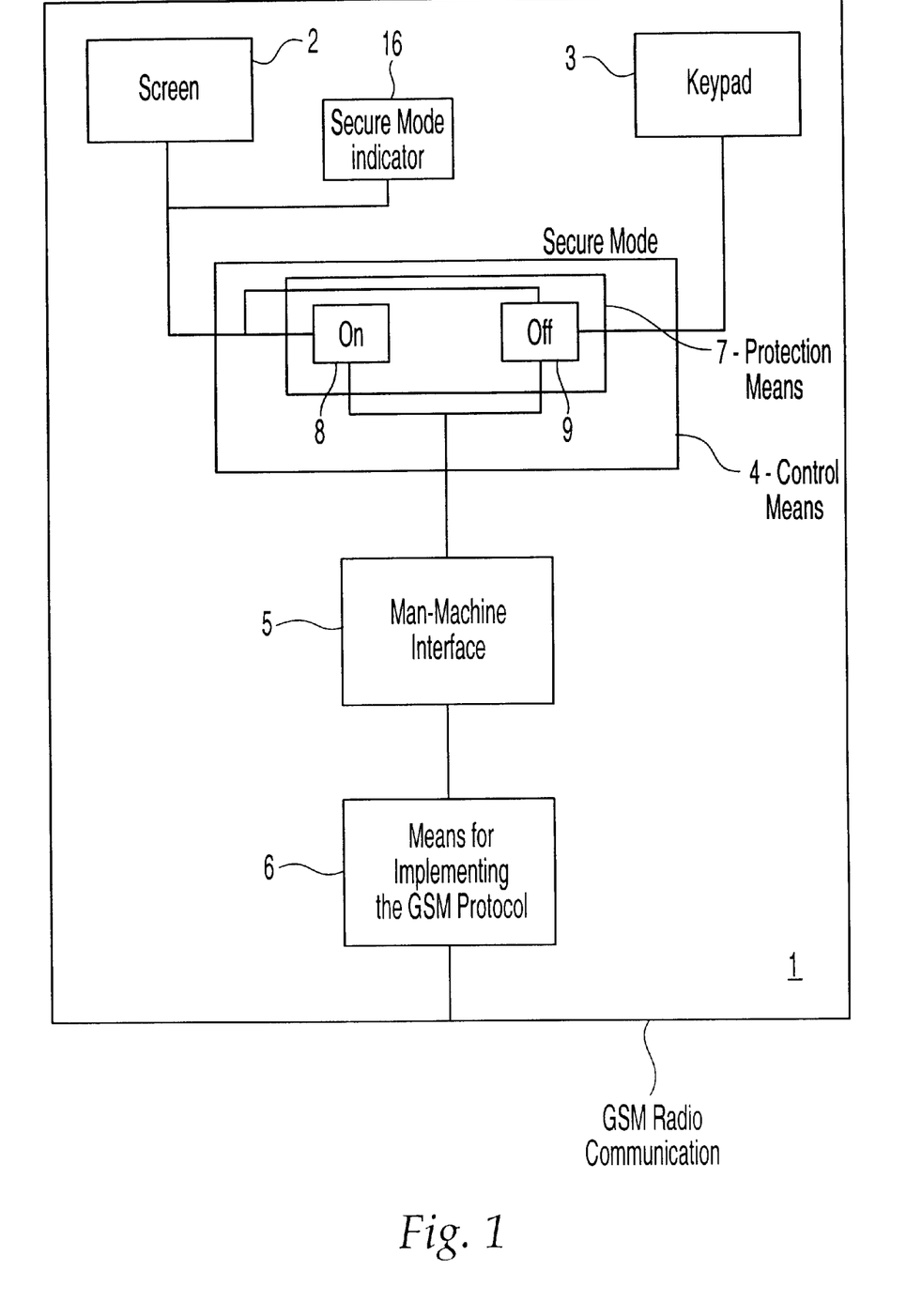
FIG. 1 is a functional block diagram of a radiocommunications terminal implementing the method of the invention.

In FIG. 1, the radiocommunications terminal 1 includes a screen 2 and a keypad 3, both connected to control means 4.

The control means 4 are connected to an RHM (man-machine dialog) interface 5 connected to means 6 for implementing the GSM protocol (GSM protocol layers).

The means 4, 5 and 6 control information received or sent by the terminal, which can be user information or terminal information, as described above.

When the terminal is operational, it usually reverts to a standby mode 14 when it is not being used, in order to conserve power. However, when in standby modes 14, the terminal can be used at any time and it has no particular protection. Thus the user or any other person can use the terminal for call mode 10 to receive a call and also to make a call or to transmit messages such as SMS messages, for example. When the terminal is in standby mode, it is accessible and anyone can use most of its functions, even if they are not authorized to do so as shown in the second embodiment of FIG. 3a.

To prevent an unauthorized person using the terminal 1, the control means 4 include means 7 of the invention for protecting the terminal against unauthorized use. The object of the protection means is to prevent unauthorized use of the terminal whilst keeping it operational.

To this end, the protection means 7 include:

switching means 8 for switching the terminal automatically to a secure mode 12 in which the sending of at least one type of user information is prohibited and the sending of at least one type of terminal information is authorized, the switching means 8 being connected to the screen 2 and to the interface 5, and means 9 for canceling secure mode connected to the screen 2, to the keyboard 3, and to the interface 5.

It will be recalled that user information means any information transmitted at the initiative of or to the benefit of the user.

Accordingly, outgoing calls, which are considered to be user information, cannot be sent while the terminal is in secure mode.

On the other hand, it is essential for the terminal to remain potentially operational and in particular for it to be in contact with a base transceiver station of the network at all times so that it can receive information.

This is why the terminal can send terminal information, such as signaling information in particular.

It will also be recalled that terminal information means any information transmitted at the initiative of or to the benefit of the terminal.

According to the invention, secure mode is canceled by entering a predetermined code.

In more concrete terms, various situations can arise in relation to the method of the invention:

If the terminal is in call mode 10, a detection step 11 detects end-of-call information sent by the party which terminates the call, i.e. the network or the user.

When the call is terminated, the end-of-call information is transmitted to the switching means 8.

Figure 3A:
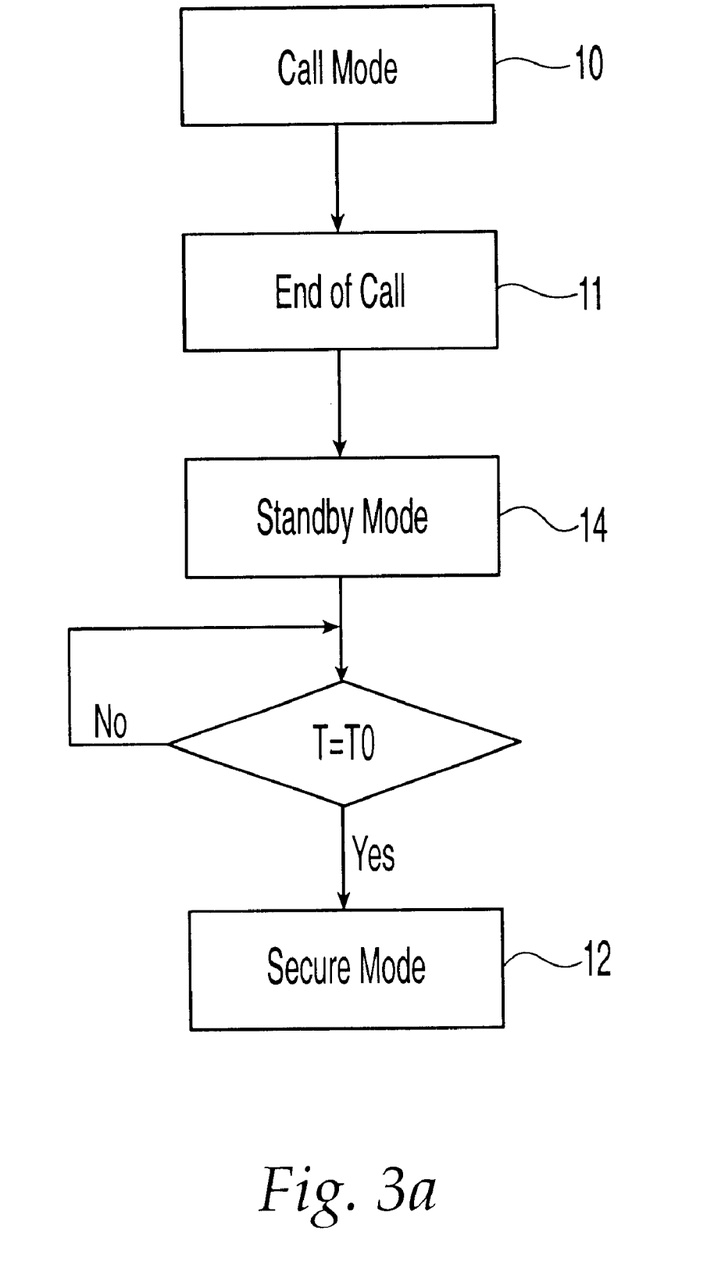
FIG. 3a is a first embodiment of switching from call mode to secure mode with timer.
Figure 3B:
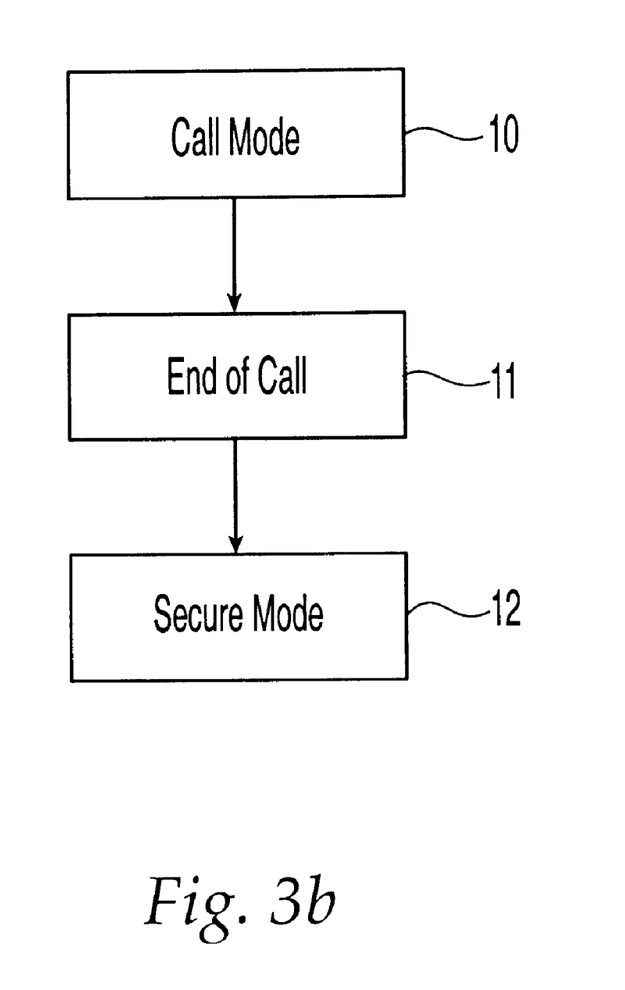
FIG. 3b is a second embodiment of switching from call mode to secure mode immediately.

In a first embodiment of the invention in FIG. 3b, the switching means 8 automatically and instantaneously switch the terminal to secure mode 12.

Figure 2:
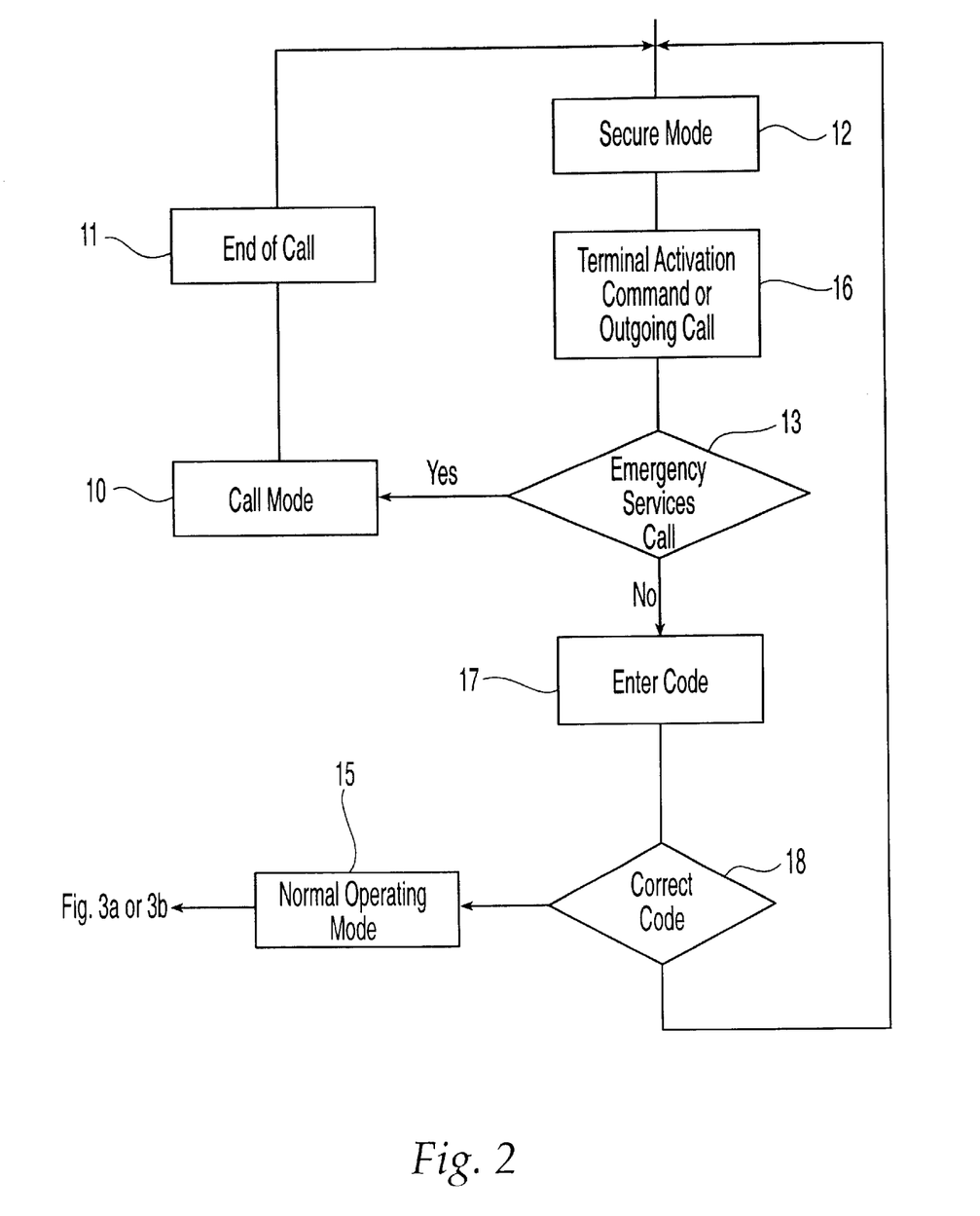
FIG. 2 is a flow chart of the steps of the protection method of the invention on changing from secure mode to another mode when making outgoing call and/or emergency calls.

This embodiment of FIG. 2 can be used in particular if, for obvious safety reasons, any person, whether authorized to use the terminal or not, has to be able to use it to send a call 13 to the emergency services.

Calls to the emergency services are usually allocated standard numbers which the GSM network can identify as such.

Consequently, it is sufficient to configure the cancellation means 9 so that they are activated not only when the code is entered but also when an emergency services call number is entered.

When the call to the emergency services is terminated, the terminal reverts automatically and instantaneously to secure mode 12, so as not to enable an unauthorized person to use the terminal again to send user information other than a call to the emergency services.

The sending of any type of user information can of course be prohibited.

There can equally be provision for returning to secure mode instantaneously, regardless of any user information previously sent.

In a second embodiment of the invention in FIG. 3a, the terminal goes first to standby mode 14 and the switching means 8 switch the terminal to secure mode after a predetermined time-delay T0.

This embodiment can be a user option to enable users to avoid entering their code every time, and in particular to send user information several times in succession, for example several outgoing calls 16 and/or several SMS messages.

Consider now the terminal in secure mode 12.

To revert to nominal operating mode 15 it is sufficient to enter the predetermined code, which is transmitted to the cancellation means 9 which switch the mode of the terminal accordingly.

Figure 4:
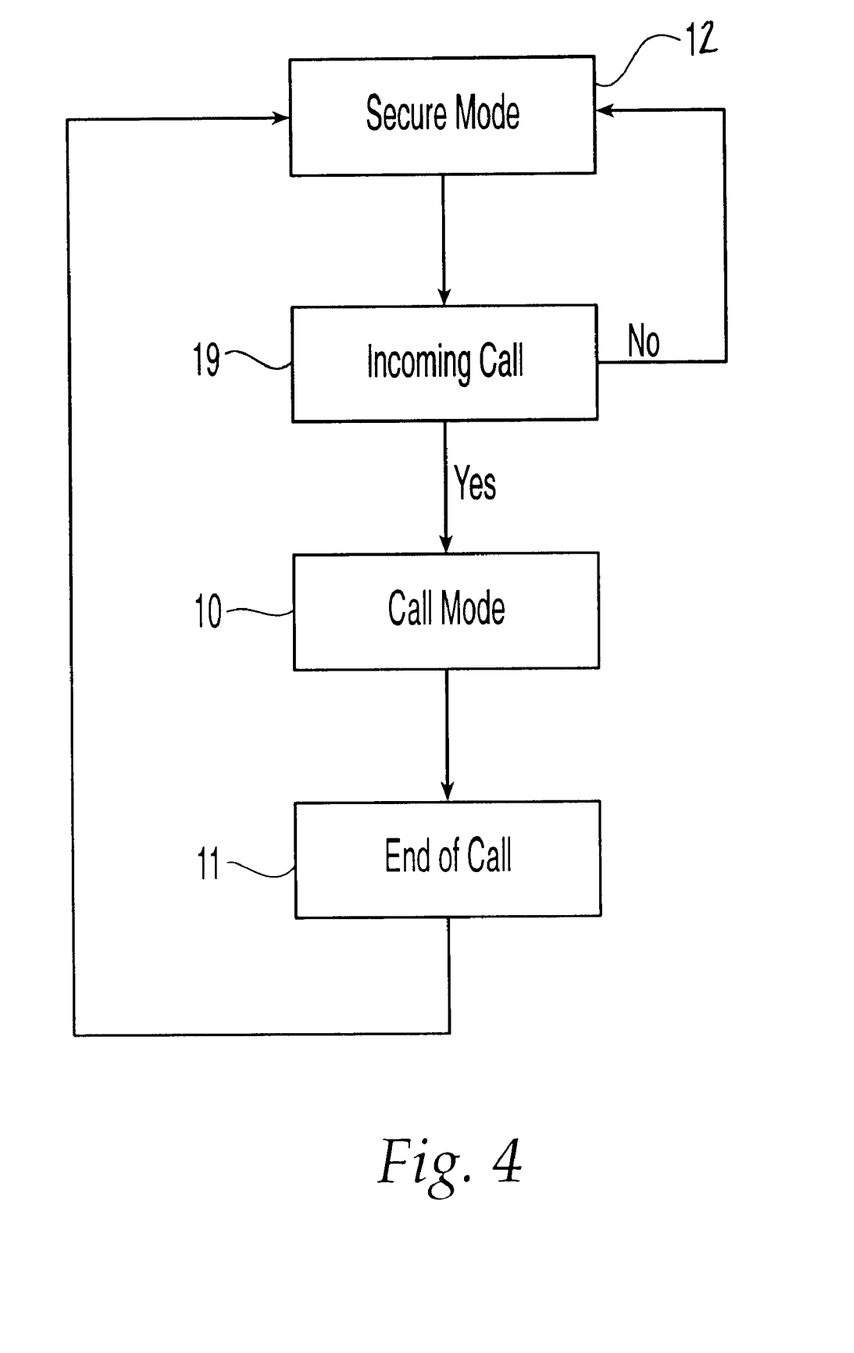
FIG. 4 is a first embodiment of the incoming call during secure mode by switching call mode without entering the code.

There are several solutions to the situation of the terminal receiving incoming call 19 type user information:

In a first embodiment of FIG. 4, the terminal is then switched to call mode 10, but reverts automatically and instantaneously to secure mode 12 at the end of a call.

Figure 5:
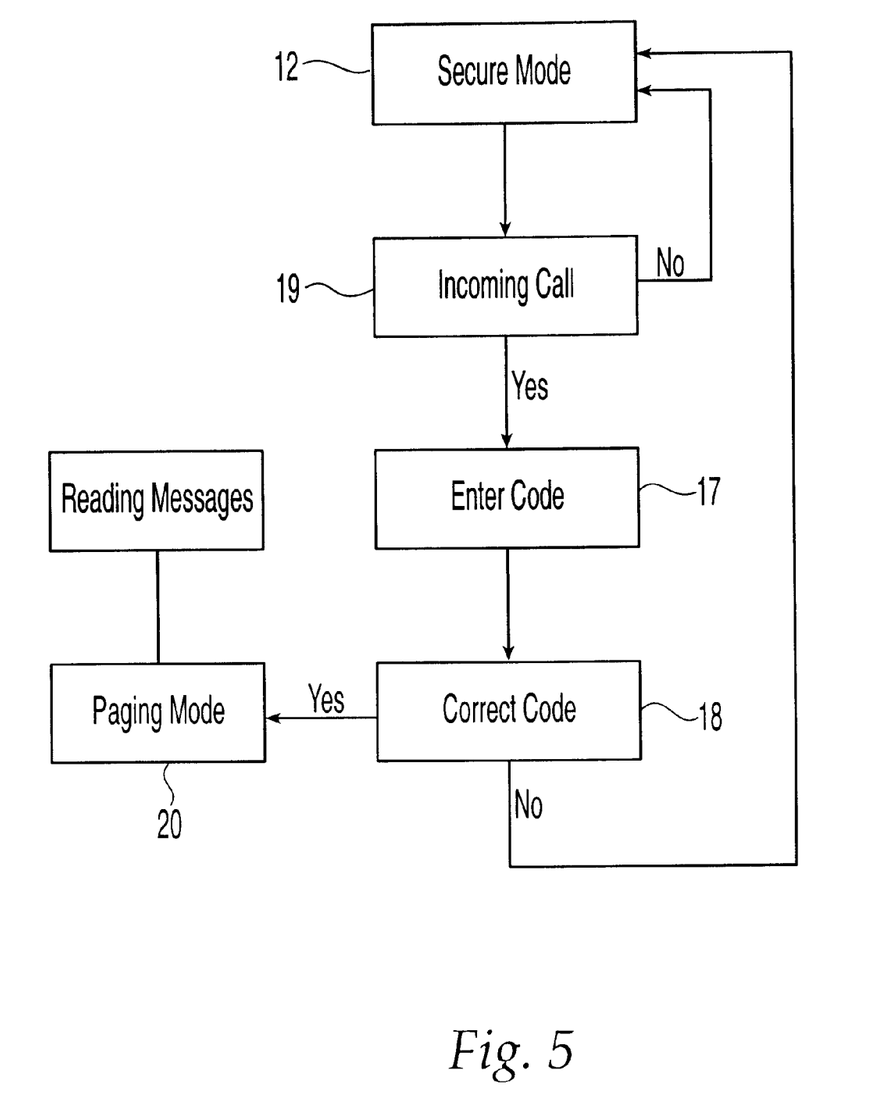
FIG. 5 is a second embodiment of the incoming call during secure mode by entering code to switch the secure mode to paging mode.

In a second embodiment of FIG. 5, the terminal is not switched to call mode 10 and is switched instead to paging mode 20, with reading the message being conditional on the predetermined code being entered 17,18.

Figure 6:
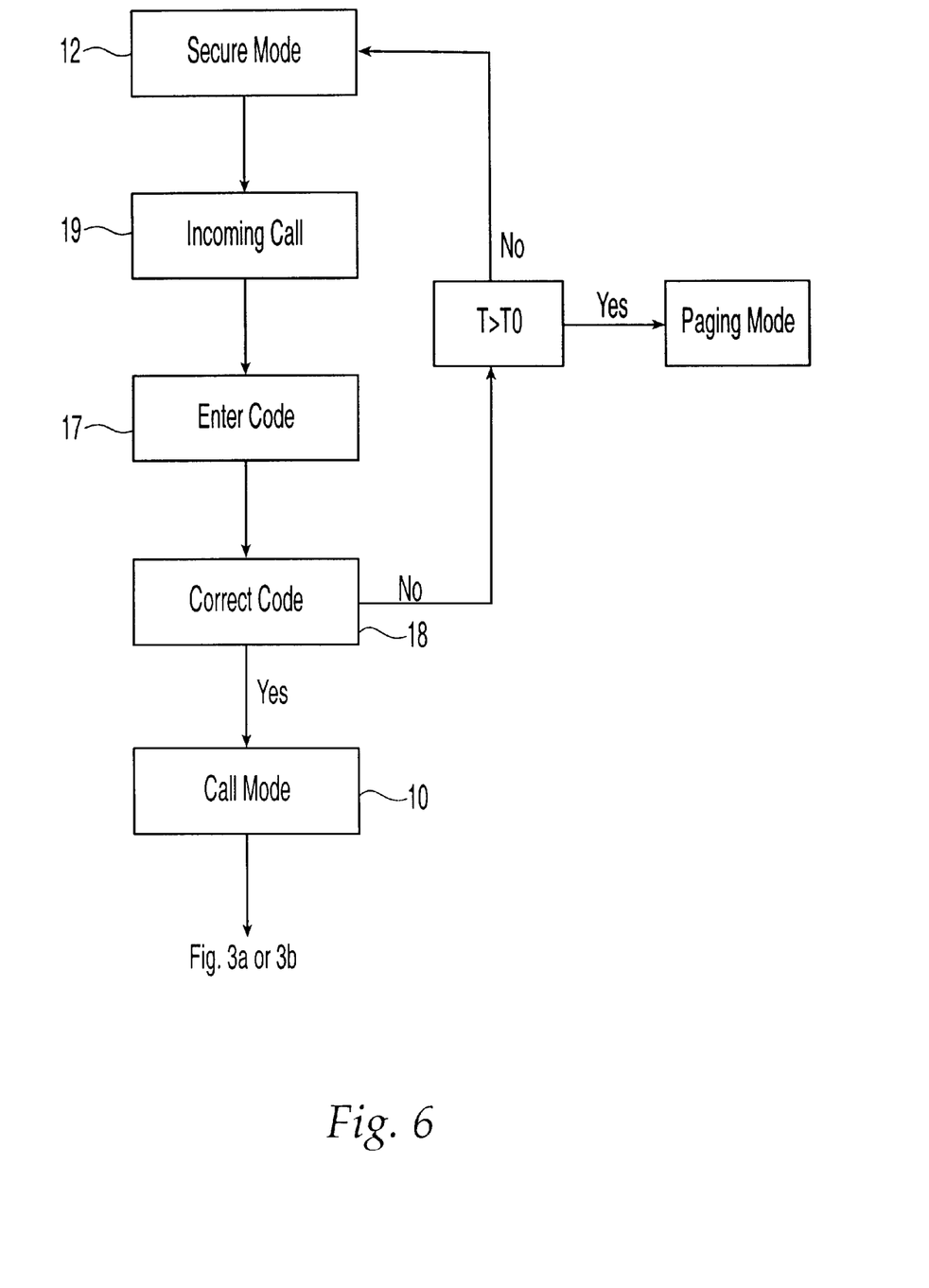
FIG. 6 is a third embodiment of the incoming call during secure mode by switching to call mode when correct code is being entered; otherwise, switching it to paging mode after a time period.

In a third embodiment of FIG. 6, users are advised of an incoming call so that they can enter their code 17,18 and take the call. There can equally be provision for the terminal to revert to paging mode after a predetermined time if the code has not been entered.

If the user information is of the SMS message type, the steps of the receive process are similar to those for standby mode but the terminal can remain in secure mode, depending on the nature of the SMS message.

SMS messages can be of various types (class 0, class 1, class 2, etc.). According to the standard, some of these types are displayed automatically on the screen so that the user is advised of them instantaneously.

For this type of message, the terminal remains in secure mode but displays the message. This guarantees the required security.

For other types of SMS message, that do not need to be displayed automatically, the terminal remains in secure mode and consultation of received messages is conditional on the authorized user's code being entered.

For enhanced power saving, the screen 2 of the terminal can be deactivated when it is in secure mode. The functions previously described remain active and the screen 2 is activated as soon as it is needed, in particular to display received message icons.

In an embodiment, it can remain deactivated even when messages are received, users being advised of the incoming message either by an audible indicator or when they switch the terminal to its nominal operating mode 15.

In another embodiment, the terminal includes means 16 for signaling secure mode, so that users can distinguish the terminal's off mode from its secure mode, in particular when the screen of the terminal is deactivated.

These signaling means can be the light-emitting diode used in a manner familiar to the skilled person to indicate connection to the network.

What is claimed is:

1. A method of protecting an already initially activated radiocommunications terminal against unauthorized use while keeping the terminal operational, the terminal being adapted to send and receive a plurality of types of user information and a plurality of types of terminal information, said method comprising the steps of: when no user information is transmitted, automatically switching the terminal into a secure mode in which the sending of at least one type of user information is prohibited and the sending of at least one type of terminal information is authorized, and canceling the secure mode by entering a predetermined code.

2. The method according to claim 1, wherein the step of automatically switching to the secure mode occurs after a predetermined time-delay.

3. The method according to claim 1, wherein the radiocommunications terminal includes a display screen, and further comprising the step of deactivating the screen in the secure mode.

4. The method according to claim 1, further comprising the steps of:

authorizing the receiving by the terminal of an incoming call when the terminal is in the secure mode, and instantaneously switching back to the secure mode at the end of the call.

5. The method according to claim 1, further comprising the step of maintaining the terminal in the secure mode if the terminal receives short message service message type user information when the terminal is in secure mode.

6. The method according to claim 5, further comprising the steps of:

maintaining the terminal in the secure mode, and displaying the received short message service message type user information.

7. The method according to claim 5, wherein said terminal includes a display screen, said method further comprising the steps of:

storing the short message service message type user information, and maintaining the terminal in the secure mode and the display screen of the terminal in a deactivated state.

8. The method according to claim 1, further comprising the step of prohibiting sending of all types of user information in the secure mode.

9. The method according to claim 1, further comprising the step of authorizing sending of emergency services call type user information in the secure mode.

10. A radiocommunications terminal adapted to send and receive a plurality of types of user information and a plurality of types of terminal information, the terminal including protection means for protecting the terminal against unauthorized use, while keeping the terminal operational, by implementing a method of protecting an already initially activated radiocommunications terminal against unauthorized use while keeping the terminal operational, said method comprising the steps of: when no user information is transmitted, automatically switching the terminal into a secure mode in which the sending of at least one type of user information is prohibited and the sending of at least one type of terminal information is authorized, and canceling the secure mode by entering a predetermined code, the protection means comprising:

switch means for switching the terminal automatically to said secure mode in which the sending of at least one type of user information is prohibited and the sending of at least one type of terminal information is authorized, and activatable cancellation means for canceling the secure mode.

11. The terminal according to claim 10, further comprising means for activating the cancellation means by entering the predetermined code.

* * * * *